in United States Patent (10) Patent No.: US 11,745,731 B2
Harai et al. (45) Date of Patent: Sep. 5, 2023

(54) VEHICLE CONTROL DEVICE

(71) Applicant: HITACHI ASTEMO, LTD., Hitachinaka (JP)

(72) Inventors: Tatsunori Harai, Hitachinaka (JP); Takashi Tsutsui, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 0 days.

(21) Appl. No.: 17/774,457

(22) PCT Filed: Sep. 29, 2020

(86) PCT No.: PCT/JP2020/036782
§ 371 (c)(1),
(2) Date: May 4, 2022

(87) PCT Pub. No.: WO2021/090610
PCT Pub. Date: May 14, 2021

(65) Prior Publication Data
US 2022/0402483 A1 Dec. 22, 2022

(30) Foreign Application Priority Data
Nov. 7, 2019 (JP) .................................. 2019-202370

(51) Int. Cl.
*B60W 30/06* (2006.01)
*B60W 50/12* (2012.01)

(52) U.S. Cl.
CPC ............ *B60W 30/06* (2013.01); *B60W 50/12* (2013.01); *B60W 2510/20* (2013.01)

(58) Field of Classification Search
CPC .. B60W 30/06; B60W 50/12; B60W 2510/20; B62D 15/0285; B62D 1/02;
(Continued)

(56) References Cited

U.S. PATENT DOCUMENTS

2003/0040857 A1   2/2003  Akita
2016/0159388 A1*  6/2016  Sekiya .................. B62D 5/0409
                                                                180/446
(Continued)

FOREIGN PATENT DOCUMENTS

JP   2003-054435 A   2/2003
JP   2006-146811 A   6/2006
(Continued)

OTHER PUBLICATIONS

International Search Report with English Translation and Written Opinion for Application No. PCT/JP2020/036782, dated Dec. 28, 2020 (8 pages).

*Primary Examiner* — Kira Nguyen
(74) *Attorney, Agent, or Firm* — Foley & Lardner LLP

(57) ABSTRACT

To obtain a vehicle control device capable of creating a route that facilitates tracing by a vehicle in autonomous driving and improving positional accuracy of the vehicle at the time of tracing. A vehicle control device (520) of the present invention includes an oversteer angle determination unit (508) that determines whether or not a steering angle of a vehicle (10) is an oversteer angle, a stationary steering determination unit (509) that determines whether or not stationary steering operation is performed on a vehicle, a route storage mode detection unit (505) that determines whether or not a route storage mode is set, a specific operation detection unit (507) that determines whether a steering angle is the oversteer angle or the stationary steering operation is performed in the route storage mode, and an output unit that outputs a control command of steering angle restriction control that restricts steering operation of a driver in the route storage mode in a case where the specific operation detection unit determines that a steering angle is (Continued)

the oversteer angle or the stationary steering operation is performed.

6 Claims, 8 Drawing Sheets

(58) Field of Classification Search
CPC .......... B62D 15/027; B60L 1/00; G08G 1/00; G08G 1/16
See application file for complete search history.

(56) References Cited

U.S. PATENT DOCUMENTS

| 2018/0362043 | A1* | 12/2018 | Hwang | B62D 15/025 |
| 2019/0066516 | A1* | 2/2019 | Kuhara | G08G 1/202 |
| 2020/0290601 | A1* | 9/2020 | Yamanaka | B60W 10/20 |

FOREIGN PATENT DOCUMENTS

| JP | 2006-298115 A | 11/2006 |
| JP | 2008-056173 A | 3/2008 |
| JP | 2008-290669 A | 12/2008 |
| JP | 2015-058842 A | 3/2015 |
| JP | 2015-214225 A | 12/2015 |

* cited by examiner

VEHICLE CONTROL DEVICE

TECHNICAL FIELD

The present invention relates to a vehicle control device, and more particularly to a device that detects steering operation.

BACKGROUND ART

When autonomous driving of an automobile is realized, it can be considered a reliable measure to allow a vehicle to pass, by autonomous driving, through the same position as a position where the vehicle has passed by operation of a driver in the past. This is because there is no possibility of contact with at least a static obstacle.

PTL 1 shows a technique of a vehicle parking device including a vehicle position detection unit that stores a traveling track and detects position information of a vehicle as a vehicle that performs parking, a parking position storage unit that stores the position information of the vehicle detected by the vehicle position detection unit as a parking target position of the vehicle, a traveling track storage unit that stores a traveling track of the vehicle from the parking target position until the vehicle moves and stops, and a control unit that refers to information stored in the parking position storage unit and the traveling track storage unit and controls movement of the vehicle to the parking target position along the traveling track.

CITATION LIST

Patent Literature

PTL 1: JP 2006-146811 A

SUMMARY OF INVENTION

Technical Problem

In the technique of PTL 1, a route on which a vehicle has traveled by operation of a driver in the past is stored, and autonomous driving by which the vehicle travels so as to trace the stored route is performed. However, as described in (1) and (2) below, an operation range of steering operation that can be performed by the driver and an operation range of steering operation that can be performed as a substitute by a control actuator of the vehicle are different.

(1) For example, the power steering device amplifies a manual operation force of the driver, and a force obtained by combining the manual operation force of the driver and a steering assist force becomes a force for operating a steering wheel. In a case of autonomous driving without input of the manual operation force from the driver, the steering wheel is operated only by a steering force generated by the control actuator in a state where steering operation by the driver is not applied. For this reason, the force is insufficient near a maximum steering angle, and the steering wheel cannot be adjusted to a maximum steering angle.

Therefore, if the driver travels by using the maximum steering angle during route storage, the force of the control actuator is insufficient during autonomous driving, the steering wheel cannot be adjusted to the maximum steering angle, and the steering angle is insufficient. For this reason, the route at the time of being stored cannot be reproduced only by the steering assist force, and the vehicle travels outward the route once and gradually returns to the original route.

For this reason, in a case where a large lateral position error occurs at a location where a road width is small, the vehicle may not travel due to deviation from the route or an obstacle.

In order to prevent this, it is necessary for the driver to generate a route by operating the steering wheel in a steering range in which steering can be performed only by the steering force generated by the control actuator without adjusting the steering angle to the vicinity of the maximum steering angle. However, whether or not the angle is an upper limit angle of the range in which steering can be performed only by the steering force generated by the control actuator has been checked only by visually checking a rotation amount of the steering wheel, and it has been difficult to observe the upper restrict angle while the route is being stored, that is, during driving.

(2) Further, even if the problem of the steering assist force of (1) described above is excluded, an actual steering angle and a turning radius have a non-linear relationship near the maximum steering angle due to a characteristic of the vehicle. Since it is difficult to trace a precise route during autonomous driving due to the characteristic of the vehicle, it is desirable to execute the autonomous driving after setting an upper limit of a steering angle before the maximum steering angle.

The present invention has been made in view of the above points, and an object of the present invention is to provide a vehicle control device capable of creating a route that facilitates tracing by a vehicle in autonomous driving and improving positional accuracy of the vehicle at the time of tracing.

Solution to Problem

A vehicle control device of the present invention that solves the above problem is a vehicle control device having a normal driving mode in which a vehicle is driven according to operation of a driver, a route storage mode in which a travel route of the vehicle is stored, and an autonomous driving mode in which autonomous driving of the vehicle is performed by using the stored travel route. The vehicle control device includes an oversteer angle determination unit that determines whether or not a steering angle of the vehicle is an oversteer angle, a stationary steering determination unit that determines whether or not stationary steering operation is performed on the vehicle, a route storage mode detection unit that determines whether or not the route storage mode is set, a specific operation detection unit that determines whether the steering angle is the oversteer angle or the stationary steering operation is performed in the route storage mode, and an output unit that outputs a control command of steering angle restriction control to restrict steering operation of the driver in the route storage mode in a case where the specific operation detection unit determines that the steering angle is the oversteer angle or the stationary steering operation is performed.

Advantageous Effects of Invention

According to the present invention, it is possible to create a route that facilitates tracing by a vehicle in autonomous driving and to improve positional accuracy of the vehicle at the time of tracing.

Further features related to the present invention will become clear from the description of the present description and the accompanying drawings. Further, an object, a configuration, and an advantageous effect other than those described above will be clarified in description of an embodiment described below.

DESCRIPTION OF EMBODIMENTS

As an example of the vehicle control device of the present invention, a vehicle including a vehicle control device that performs what is called a last mile autonomous driving that automates movement in a parking lot and movement to the parking lot will be described. The vehicle control device of the present invention is applicable to both parking operation and autonomous driving on a general road.

[Configuration of Vehicle]

Figure 1:
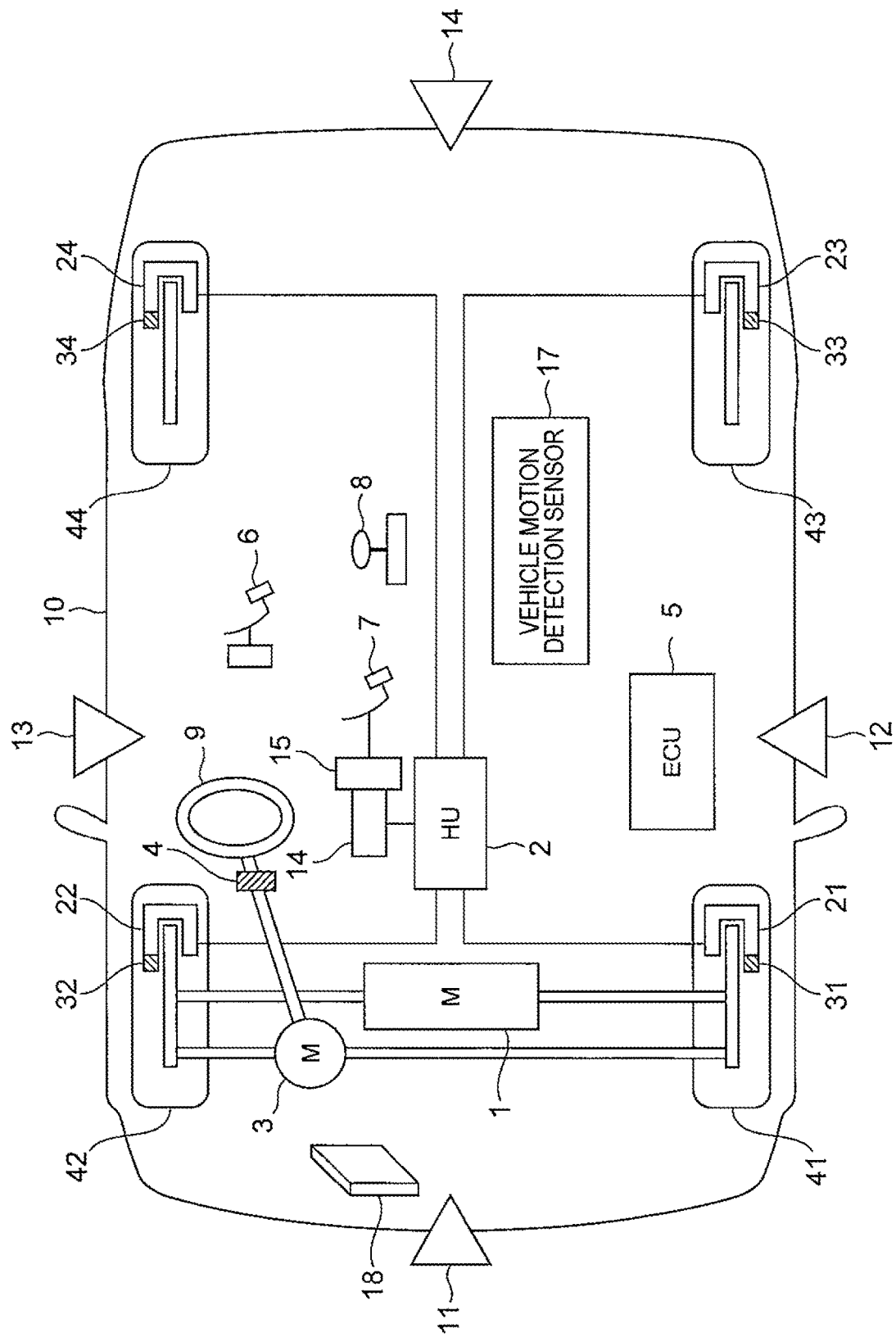
FIG. 1 is a configuration diagram of a vehicle including a vehicle control device according to the present embodiment.

FIG. 1 is a configuration diagram of a vehicle to which the vehicle control device of the present embodiment is applied.

A vehicle 10 is an electric car having a battery and a drive motor 1 that receives power supply from the battery. The vehicle 10 receives an instruction of forward movement, backward movement, or stop by operation of a shift lever 8 by the driver, generates a driving force of the drive motor 1 by operation of an accelerator pedal 6 by the driver, and travels by the driving force of the drive motor 1. The drive motor 1 may be an engine (internal combustion engine). The drive motor 1 can generate a driving force and a braking force independently of operation of the accelerator pedal 6 and operation of the shift lever 8 by the driver.

A tread force of a brake pedal 7 by the driver is boosted by a brake booster 15, and a hydraulic pressure corresponding to the force is generated in a master cylinder 14. The hydraulic pressure generated in the master cylinder 14 is supplied to wheel cylinders 21 to 24 via an electric hydraulic brake (HU) 2. In this manner, the driver can control a braking force of the vehicle 10 by operating the brake pedal 7. The electric hydraulic brake 2 which is a control actuator includes a pump driven by a motor, an electromagnetic valve, and the like, and can independently control a braking force of four wheels (hydraulic pressure of the wheel cylinders 21 to 24) even when the driver does not operate the brake pedal 7.

An electric power steering (power steering device) 3 which is a control actuator generates assist torque corresponding to steering torque input by the driver via a steering wheel 9, and left and right front wheels (steering wheels) 41 and 42 of the vehicle are steered by the steering torque of the driver and the assist torque of the electric power steering 3. Then, the vehicle turns by traveling at a predetermined steering angle. Further, the electric power steering 3 generates steering torque even when the driver does not operate the steering wheel 9, and can steer the left and right front wheels 41 and 42.

Further, a plurality of cameras 11 to 14 that capture an image around the vehicle and recognize an object around the vehicle are attached to the front, rear, left, and right of the vehicle 10. Images of the cameras 11 to 14 are synthesized and displayed on a touch panel 18 as a bird's-eye view of the vehicle 10 and the periphery of the vehicle as viewed from above.

The vehicle 10 includes an electronic control unit (ECU) 5 that controls the drive motor 1, the electric hydraulic brake 2, and the electric power steering 3. The ECU 5 includes a vehicle control device that recognizes a host vehicle position on the basis of a white line frame on an image of the cameras 11 to 14 and a position of a surrounding vehicle, and performs control for the vehicle to trace a stored route stored in advance.

The vehicle control device also enables the driver to instruct a parking position from the touch panel 18 on which the bird's-eye view image is displayed. The vehicle control device can start an autonomous driving control application by the driver or the like operating the touch panel 18 or a mobile terminal 19 (see FIG. 2) communicating with the touch panel 18. Note that the driver or the like includes a driver or a passenger of the vehicle, or a user of the vehicle. The mobile terminal 19 is constituted by a general computer including a communicating means such as a smartphone or a remote control unit. The driver or the like can control autonomous driving of the vehicle from inside or outside the vehicle by using an autonomous driving control application started in a computer.

A steering angle sensor 4 and wheel speed sensors 31 to 34 are attached to the vehicle 10 in order to control a moving route of the vehicle 10. The electric hydraulic brake 2 controls anti-skid and anti-lock braking of the vehicle by a sensor signal from a vehicle motion detection sensor 17, the steering angle sensor 4, and the wheel speed sensors 31 to 34 that detect a longitudinal acceleration, a lateral acceleration, and a yaw rate. A signal from the steering angle sensor 4 and the wheel speed sensors 31 to 34 is also used for control of autonomous driving.

All electric devices such as the drive motor 1 and the electric hydraulic brake 2 described above are controlled by the ECU 5, and all sensor signals are also input to the ECU 5. Sensor signals input to the ECU 5 also include an accelerator pedal operation amount, a brake pedal operation amount, a shift position, and steering torque, which are operation amounts of the driver. Further, a configuration in which a function of the ECU 5 is divided, an ECU is attached to each electric device, and necessary information is communicated between the ECUs.

The drive motor 1, the electric hydraulic brake 2, the wheel cylinders 21 to 24, the wheels 41 to 44, and the ECU 5 constitute an automatic vehicle speed control device that automatically controls a vehicle speed. Further, the electric power steering 3 and the ECU 5 constitute an automatic steering control device that automatically steers the left and right front wheels 41 and 42.

Figure 2:
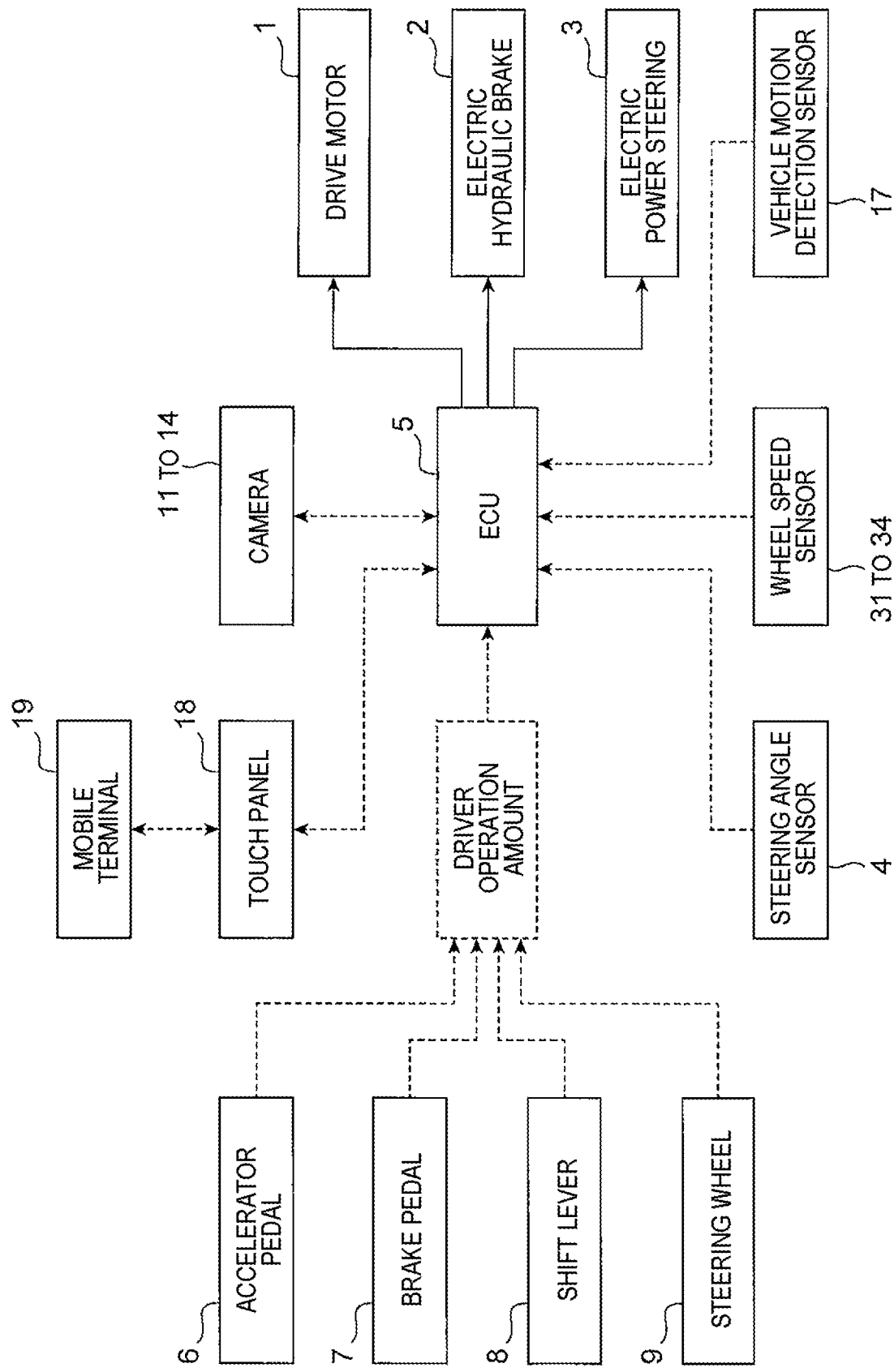
FIG. 2 is a configuration diagram of the vehicle control device according to the present embodiment.

FIG. 2 is a configuration diagram of the vehicle control device according to the present embodiment.

Information on a driver operation amount is input to the ECU 5. The information on the driver operation amount includes at least one piece of information on an operation amount of the accelerator pedal 6, the brake pedal 7, the shift lever 8, and the steering wheel 9. The drive motor 1, the electric hydraulic brake 2, and the electric power steering 3 are connected to the output side of the ECU 5, and a control command value for controlling these components is output.

During autonomous driving, vehicle operation is automatically controlled by the drive motor 1, the electric hydraulic brake 2, and the electric power steering 3. The driver operation amount is monitored by the ECU 5, and override by driver operation is possible. For example, in a case where the driver operates the brake pedal 7 during autonomous driving, operation of the host vehicle is temporarily stopped. In this manner, in a case where an obstacle enters a travel route, priority is placed on the driver's brake operation to avoid contact with the obstacle.

After the above, when the driver releases the brake, the driving operation by the autonomous driving is resumed.

In this manner, in a case where the obstacle moves away from the driving route, the autonomous driving can be automatically restarted. Further, in a case where the driver changes a shift position of the shift lever 8 or steering torque of the steering wheel 9 by driver's operation becomes a predetermined value or more, the autonomous driving is stopped. In this manner, the host vehicle can be caused to travel with priority given to the driver's shift operation or steering operation. Note that the automatic control can be stopped in a manner that an automatic control stop button is displayed on the touch panel 18 or the mobile terminal 19 and the automatic control stop button is pressed by the driver.

Figure 3:
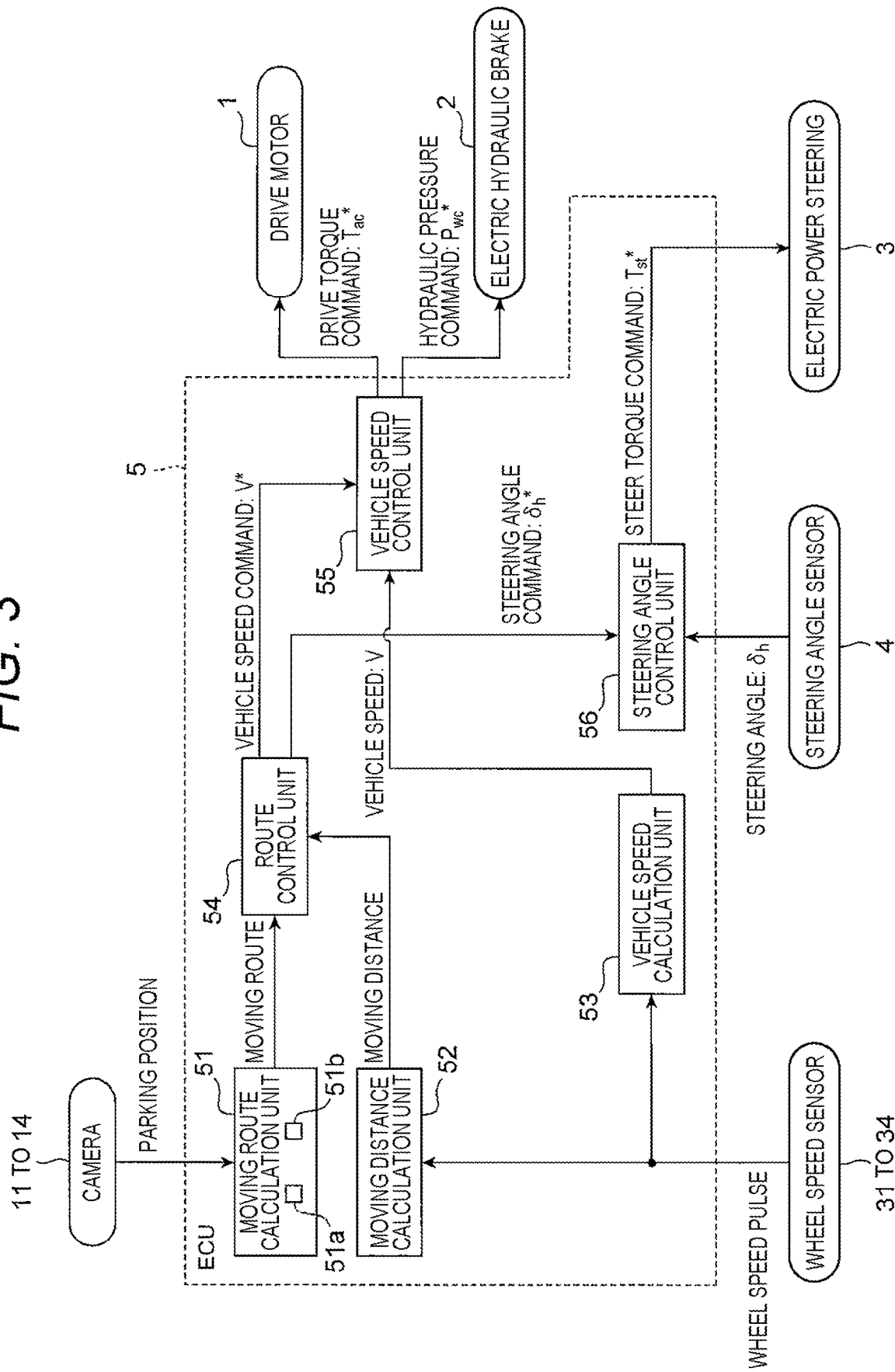
FIG. 3 is a functional block diagram of an ECU according to the present embodiment.

FIG. 3 is a functional block diagram of the ECU.

The ECU 5 includes a moving route calculation unit 51, a moving distance calculation unit 52, a vehicle speed calculation unit 53, a route control unit 54, a vehicle speed control unit 55, and a steering angle control unit 56. The moving route calculation unit 51 recognizes the position of the host vehicle by using an image captured by the cameras 11 to 14, calculates a moving route based on a stored route, and outputs the moving route to the route control unit 54. The moving distance calculation unit 52 calculates a moving distance of the host vehicle from a wheel speed pulse detected by the wheel speed sensors 31 to 34, and outputs the calculated moving distance to the route control unit 54. The vehicle speed calculation unit 53 calculates a vehicle speed of the host vehicle from the wheel speed pulse detected by the wheel speed sensors 31 to 34, and outputs the vehicle speed to the vehicle speed control unit 55. The route control unit 54 calculates a vehicle speed and a steering angle based on the moving route and a moving distance, and outputs the vehicle speed and the steering angle to the vehicle speed control unit 55 and the steering angle control unit 56. The vehicle speed control unit 55 outputs a drive torque command and a hydraulic pressure command to the drive motor 1 and the electric hydraulic brake 2 to control them, and the steering angle control unit 56 acquires information on a steering angle from the steering angle sensor 4, calculates a steering torque command value, and outputs the steering torque command value to the electric power steering 3.

Figure 4:
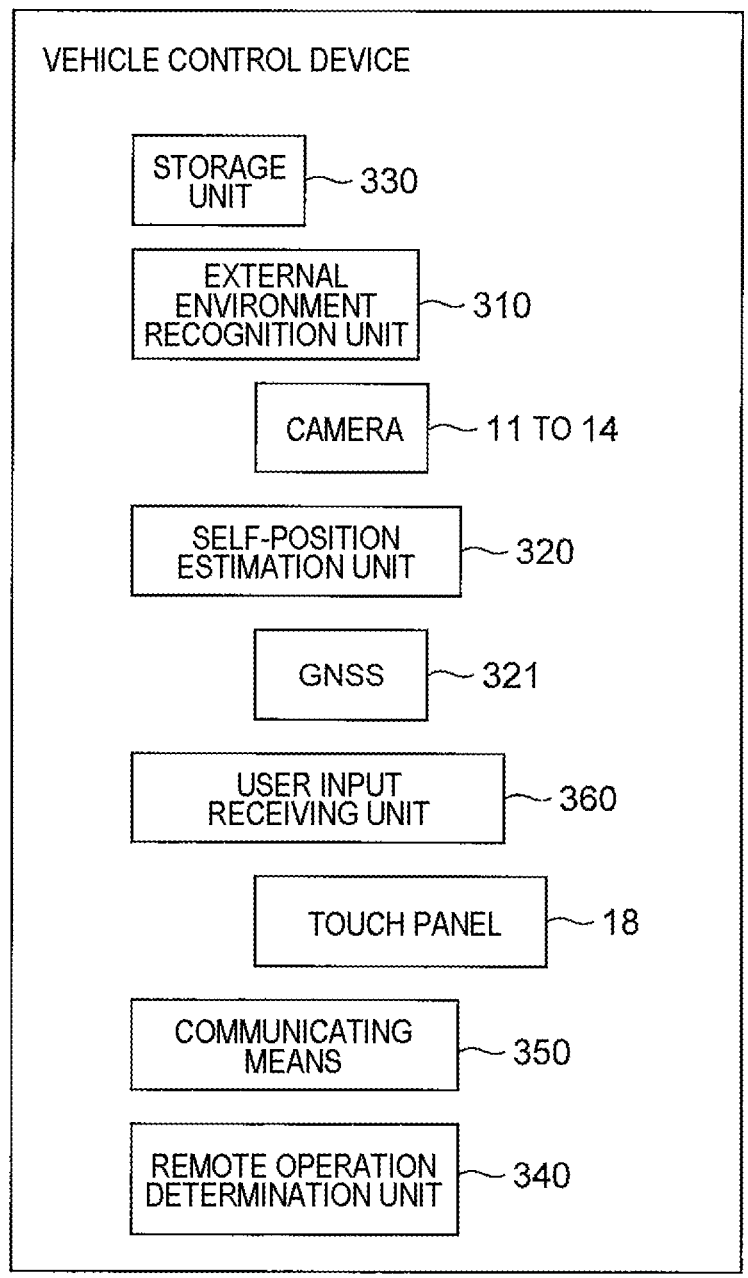
FIG. 4 is a diagram for explaining an internal function of the vehicle control device according to the present embodiment.

FIG. 4 is a diagram for explaining an internal function of the vehicle control device.

The vehicle control device includes an external environment recognition unit 310, a self-position estimation unit 320, a storage unit 330, and a remote operation determination unit 340. Further, a communication unit 350 is provided as a transmission unit that transmits a result of the remote operation determination unit 340 to the outside such as the mobile terminal 19. Further, a user input receiving unit 360 that receives a user input, and a physical interface including an electronic device such as the touch panel 18 and a button.

The external environment recognition unit 310 is connected to the cameras 11 to 14 included in the host vehicle, and can acquire peripheral information including information on an object (surrounding obstacle) present around the host vehicle and a pattern of a road surface.

The external environment recognition unit 310 can acquire peripheral information by using radar or sonar in addition to the camera.

The self-position estimation unit 320 estimates a host vehicle position based on the information from the external environment recognition unit 310. The storage unit 330 stores a travel route to a final parking position and a surrounding obstacle of the travel route. The remote operation determination unit 340 performs processing of determining that the host vehicle can be remotely and automatically parked on the basis of the self-position estimation unit 320 and the information stored in the storage unit 330. Here, the remote automatic parking means that the driver or the like operates the mobile terminal 19, which is a mobile communication device, outside the vehicle to move the host vehicle to a final parking position. The remote operation determination unit 340 compares information from the self-position estimation unit 320 and the storage unit 330, and determines that remote automatic parking is possible after determining that the host vehicle is on a route stored in advance.

The self-position estimation unit 320 collates the information recorded in the storage unit 330 with the peripheral information acquired from the external environment recognition unit 310 to estimate the host vehicle position. The self-position estimation unit 320 includes a global navigation satellite system (GNSS) 321, and can also detect position information acquired by the GNSS 321 as a current location of the host vehicle. Further, the self-position of the host vehicle may be calculated by combining the GNSS 321 and the comparison result. The touch panel 18 is provided in the vehicle interior, displays a route for the driver or the like, and displays an operation button of an autonomous driving starting device.

Figure 5:
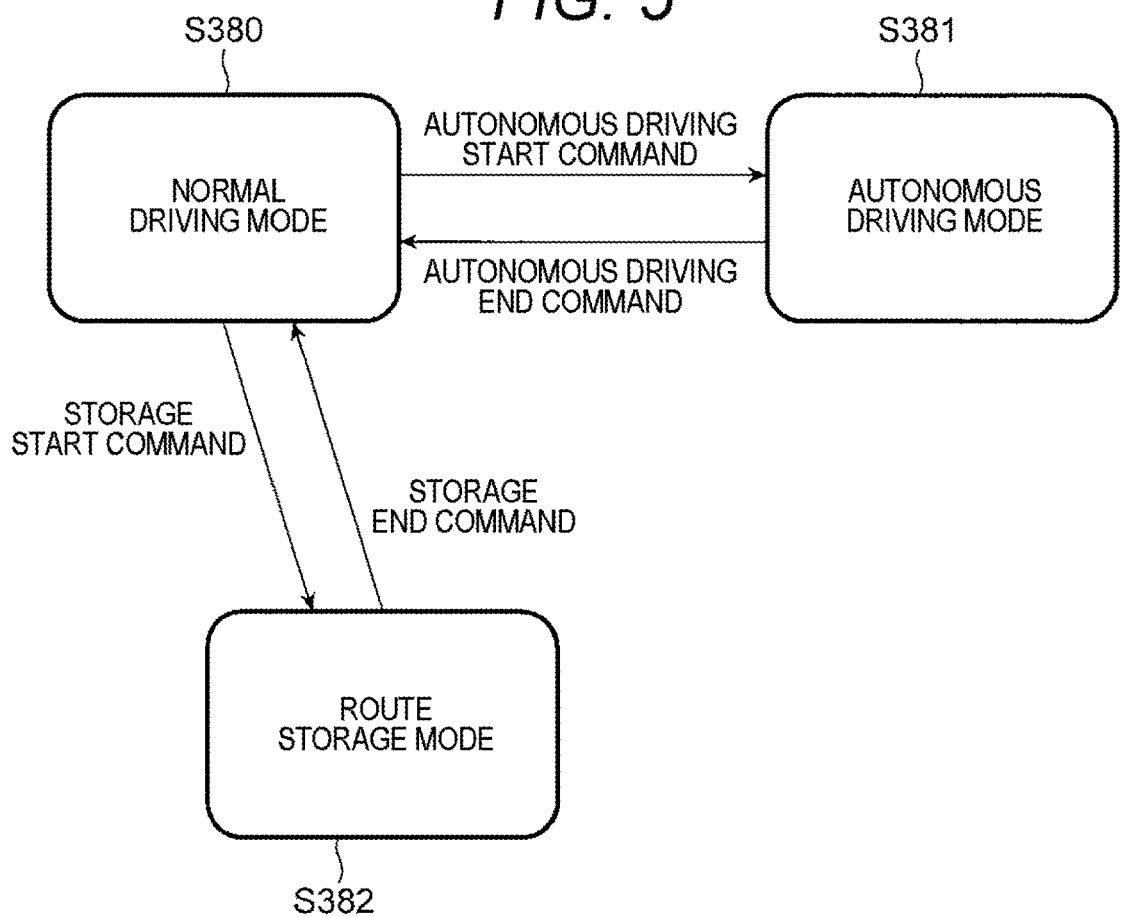
FIG. 5 is an internal state transition diagram of the vehicle control device according to the present embodiment.

FIG. 5 is an internal state transition diagram of the vehicle control device.

The vehicle control device has three modes, a normal driving mode S380, an autonomous driving mode 381, and a route storage mode S382, and has a configuration of switching the modes according to a condition. The normal driving mode S380 is a state in which autonomous driving is not performed, that is, what is called a manual driving state in which all driving operations are performed by the driver. Upon receiving an autonomous driving start command in the normal driving mode S380, the vehicle control device shifts to the autonomous driving mode 381, and shifts to the normal driving mode S380 in response to an autonomous driving end command. Then, in a case where, for example, a storage start command by a start button is received in the normal driving mode S380, the mode transitions to the route storage mode S382. The route storage mode S382 stores a travel route of the vehicle and a surrounding environment in the storage unit 330. Basically, the driver performs driving operation during the route storage mode 3382. However, operation may be performed as a substitute via the ECU 5 and the electric power steering 3 in some cases. When a storage end command by an end button is received, the storage ends, and the mode transitions to the normal driving mode S380.

Figure 6:
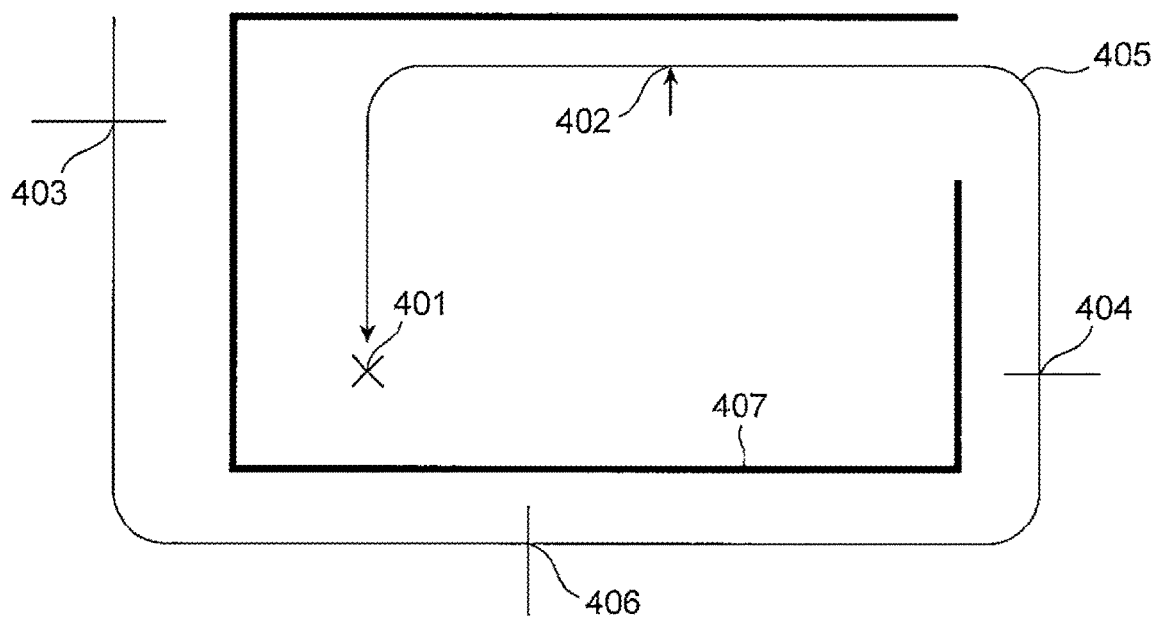
FIG. 6 is a diagram illustrating an example of a travel route on which autonomous driving is performed.

FIG. 6 is a diagram illustrating an example of a route of autonomous driving.

The storage unit 330 records in advance at least one of information on a position of the host vehicle on a travel route 405 from a recording start point 403 to a final parking position 401 and peripheral information including information on an object (peripheral obstacle) 407 present around the travel route 405 and a pattern of a road surface. The recording start point 403 is a position where recording of peripheral information is started. The travel route 405 is assumed to be recorded in the storage unit 330 in advance by driving operation of the driver or the like. A plurality of route storage points 406, 404, and 402 are set on the route of the travel route 405.

Figure 7:
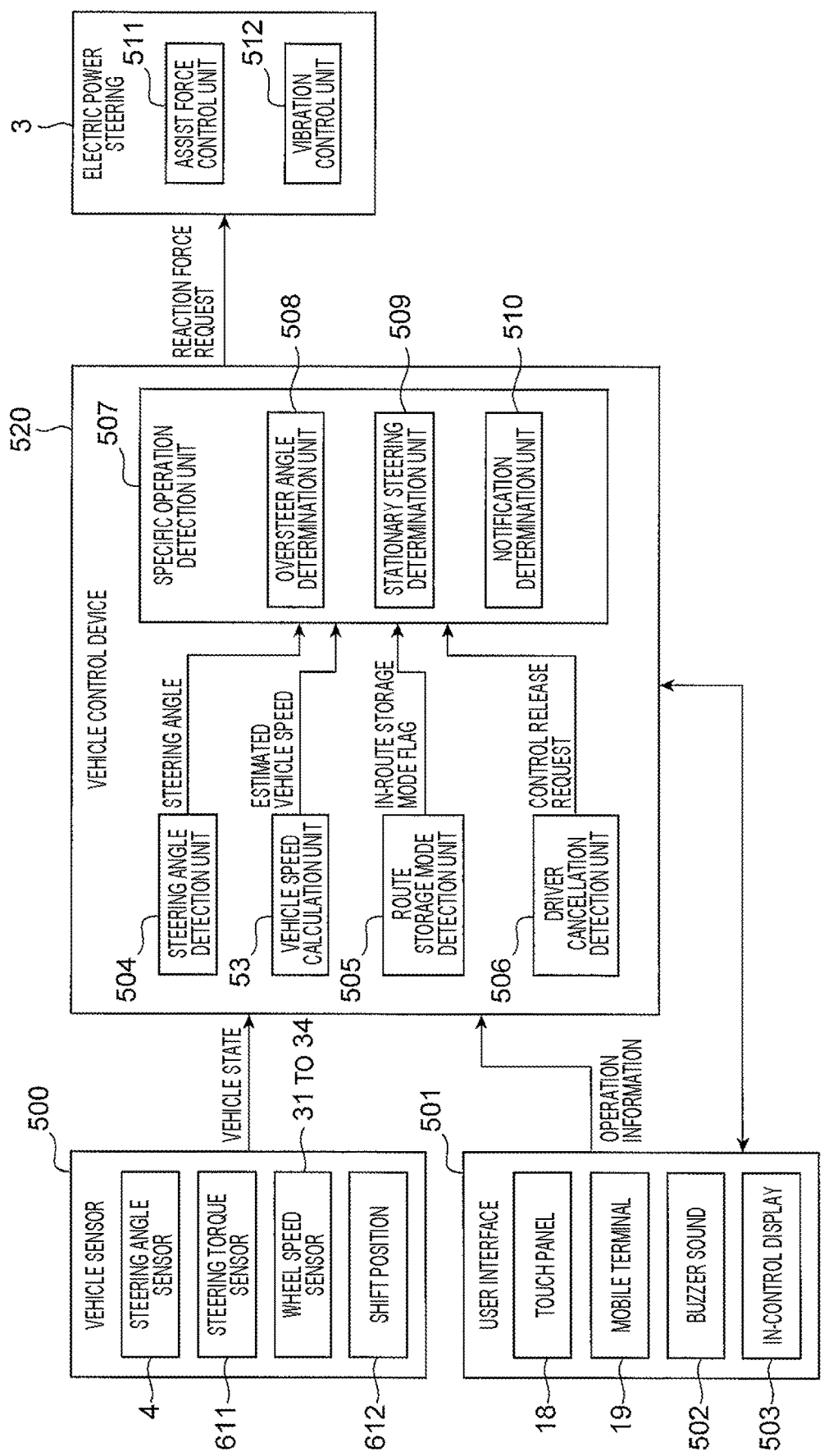
FIG. 7 is a functional block diagram of the vehicle control device according to the present embodiment.

FIG. 7 is a functional block diagram of the vehicle control device according to the present embodiment.

A vehicle control device 520 may be one function of the ECU 5 or may be a function of an ECU that operates separately. The vehicle control device 520 acquires information on a vehicle state from a vehicle sensor 500, and acquires operation information of the touch panel 18, the smartphone 19, a buzzer sound 502, and in-control display 503 from a user interface 501. The vehicle sensor 500 outputs a vehicle state detected by the steering angle sensor 4, a steering torque sensor 611, the wheel speed sensors 31 to 34, and a shift position sensor 612 provided in the vehicle to the vehicle control device 520.

The vehicle control device 520 includes a steering angle detection unit 504, the vehicle speed calculation unit 53, a route storage mode detection unit 505, a driver cancellation detection unit 506, and a specific operation detection unit 507. The steering angle detection unit 504 detects a steering angle of the steering wheel as a steering angle of the vehicle and outputs the steering angle to the specific operation detection unit 507. The vehicle speed calculation unit 53 calculates an estimated vehicle speed based on a detection signal of a wheel sensor or the like, and outputs the estimated vehicle speed to the specific operation detection unit 507. The route storage mode detection unit 505 determines whether or not the mode is the route storage mode S382, and outputs an in-route storage mode flag to the specific operation detection unit 507 when determining that the mode is the route storage mode. In a case of detecting a driver cancellation request, the driver cancellation detection unit 506 outputs a control release request (driver cancellation request) for releasing steering angle restriction control to the specific operation detection unit 507. The driver cancellation request can be made by the driver operating the user interface 501 in a case where it is necessary to release the steering angle restriction control, for example, when the vehicle cannot be moved unless the steering angle of the steering wheel is operated to a steering angle equal to or more than an oversteer angle threshold during the route storage mode S382.

The specific operation detection unit 507 detects that specific operation is performed by the driver in the route storage mode S382, and detects that either oversteer angle operation or a stationary steering operation is performed as the specific operation. The specific operation detection unit 507 includes an oversteer angle determination unit 508, a stationary steering determination unit 509, and a notification determination unit 510. The oversteer angle determination unit 508 compares a steering angle of the vehicle with a preset oversteer angle threshold to determine whether the steering angle of the vehicle is an oversteer angle larger than the preset oversteer angle threshold. The stationary steering determination unit 509 determines whether the driver has performed stationary steering operation on the vehicle.

The notification determination unit 510 performs processing of notifying that specific operation has been performed in a case where the oversteer angle operation or the stationary steering operation has been performed. The notification determination unit 510 displays a message on, for example, a display monitor in the vehicle, or generates sound or voice, and outputs a notification control command for generating vibration on a steering wheel or a seat. In a case where the specific operation detection unit 507 detects that specific operation has been performed, the vehicle control device 520 outputs a reaction force request, which is a steering angle restriction control command to restrict the driver's steering operation, to the electric power steering 3 (output unit).

In a case where a reaction force request is input from the vehicle control device 520, the electric power steering 3 performs steering angle restriction control to restrict the driver's steering operation. The electric power steering 3 includes an assist force control unit 511 and a vibration control unit 512. When a reaction force request is input from the vehicle control device 520, the assist force control unit 511 performs control to generate a steering reaction force to bias the steering wheel in a direction opposite to the direction in which the driver turns the steering wheel and apply the steering reaction force to the steering wheel, or performs control to lower the steering assist force than that in the normal driving mode S380 and increase the operational feeling (what is called a heavy steering state). In this manner, a force required to rotate the steering wheel increases, the driver can feel that the steering wheel operation is restricted, and can recognize that the driver is performing operation that is not preferable to store a travel route for autonomous driving.

Further, when a reaction force request is input from the vehicle control device 520, the vibration control unit 512 performs control to vibrate the steering wheel. Therefore, the driver can feel vibration from the steering wheel, and can recognize that the driver is performing operation that is not preferable for storing a travel route for autonomous driving.

Figure 8:
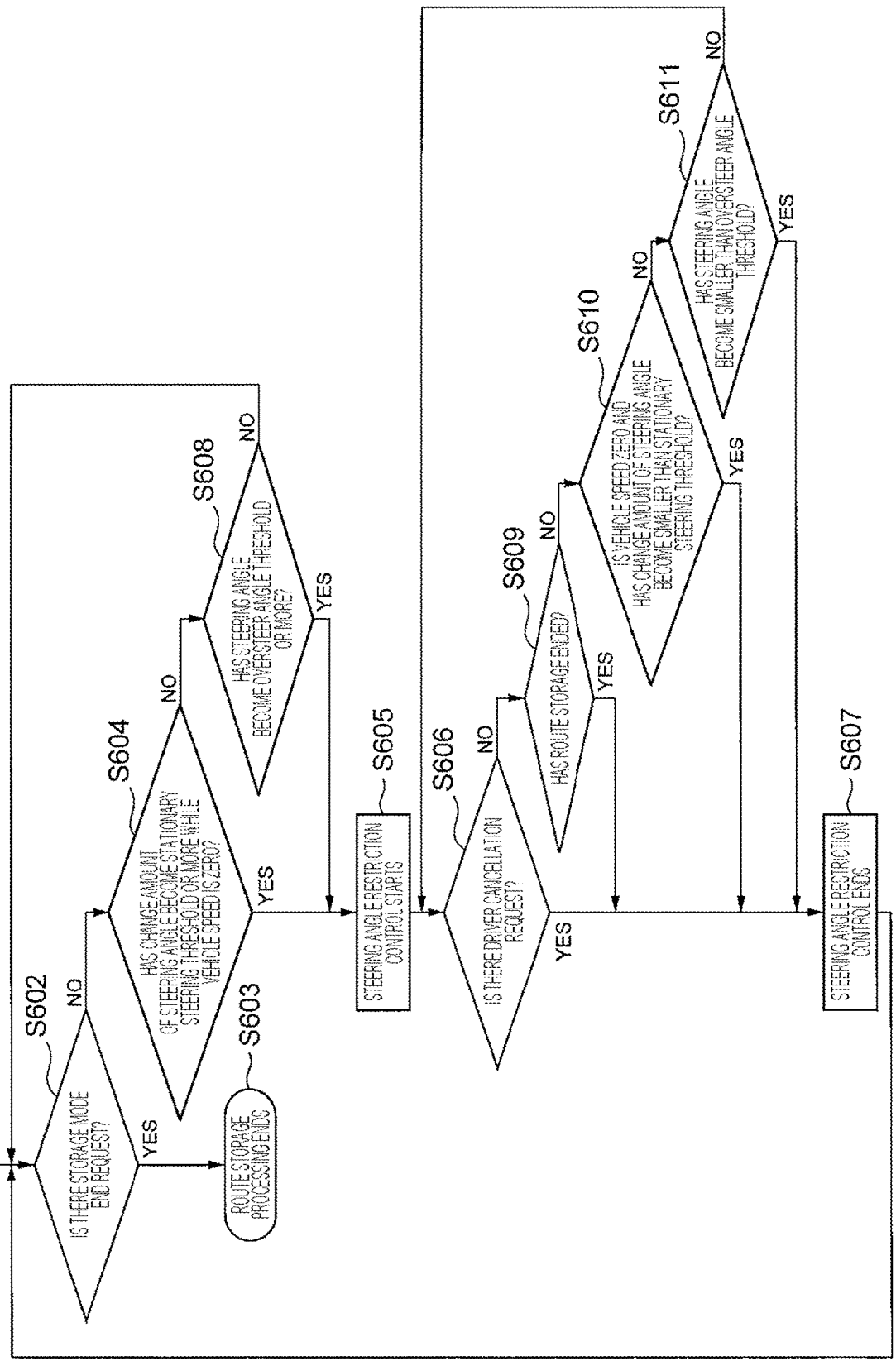
FIG. 8 is a processing flowchart of the vehicle control device according to the present embodiment.

FIG. 8 is a flowchart for explaining processing of storing a travel route.

When storage start operation for starting storage of a travel route in the storage unit 330 is performed by the driver or the like, the mode transitions from the normal driving mode S380 to the route storage mode S382, and route storage processing start S601 is performed. Then, it is determined whether or not there is a storage mode end request from the route storage processing start S601 (S602), and when it is determined that there is a storage mode end request (YES in S602), the processing proceeds to route storage processing end S603. By the route storage processing end S603, the storage of a travel route in the storage unit 330 ends, and the mode transitions from the route storage mode S382 to the normal driving mode S380. In the route storage mode S382, the driver operates the vehicle until the route storage processing end S603 is executed, and a travel route of the vehicle including start point and the end point information is stored.

In a case where there is no storage mode end request after the route storage processing start S601 (NO in S602), the processing proceeds to S604 and subsequent processing to execute the steering angle restriction control. In S604 and subsequent processing, in order to determine whether or not to execute the steering angle restriction control, processing of determining the presence or absence of a specific operation state of the steering wheel by the driver is performed.

Here, as the specific operation state, the presence or absence of the stationary steering operation (S604) and the presence or absence of the oversteer angle (S608) are determined. The stationary steering operation is operation of changing a steering angle of the steering wheel by a predetermined value or more in a state where the vehicle speed is zero. In the present embodiment, in a case where a change amount of a steering angle of the steering wheel becomes equal to or more than a preset stationary steering threshold, it is determined that the stationary steering operation is performed. For example, the presence or absence of the stationary steering operation may be determined based on torque applied to the steering wheel by the driver in addition to or instead of a change amount of a steering angle.

Further, in a case where a steering angle of the steering wheel becomes larger than a preset oversteer angle threshold, it is determined that the steering angle is an oversteer angle. The oversteer angle threshold is set on the basis of a range of steering angles at which steering can be performed only by a steering force generated by the control actuator in a state where no steering operation by the driver is added, and for example, a maximum steering angle only by the steering force generated by the control actuator is set as the oversteer angle threshold.

Then, in a case where it is determined that there is the stationary steering operation in the determination of the presence or absence of the stationary steering operation in S604 (YES in S604) or in a case where it is determined that there is the oversteer angle in the determination of the oversteer angle in S608 (YES in S608), the steering angle restriction control S605 is performed. In the steering angle restriction control S605, control of restricting the steering angle by the assist force control unit 511 and control of applying vibration to the steering wheel, a seat, and the like by the vibration control unit 512 are performed. Further, processing of displaying that the specific operation is being performed on a display monitor or the like in the vehicle or processing of notifying that by sound or voice is performed.

The steering angle restriction control S605 proceeds to steering angle restriction control end (S607) in a case where any one of four conditions of (1) whether there is a driver cancellation request (S606), (2) whether the route storage has ended (S609), (3) whether a vehicle speed zero and a change amount of a steering angle of the steering wheel has become smaller than the stationary steering threshold (S610), and (4) whether a steering angle of the steering wheel has become smaller than the oversteer angle threshold (S611) is satisfied (YES in any one of S606 to S611).

Figure 9:
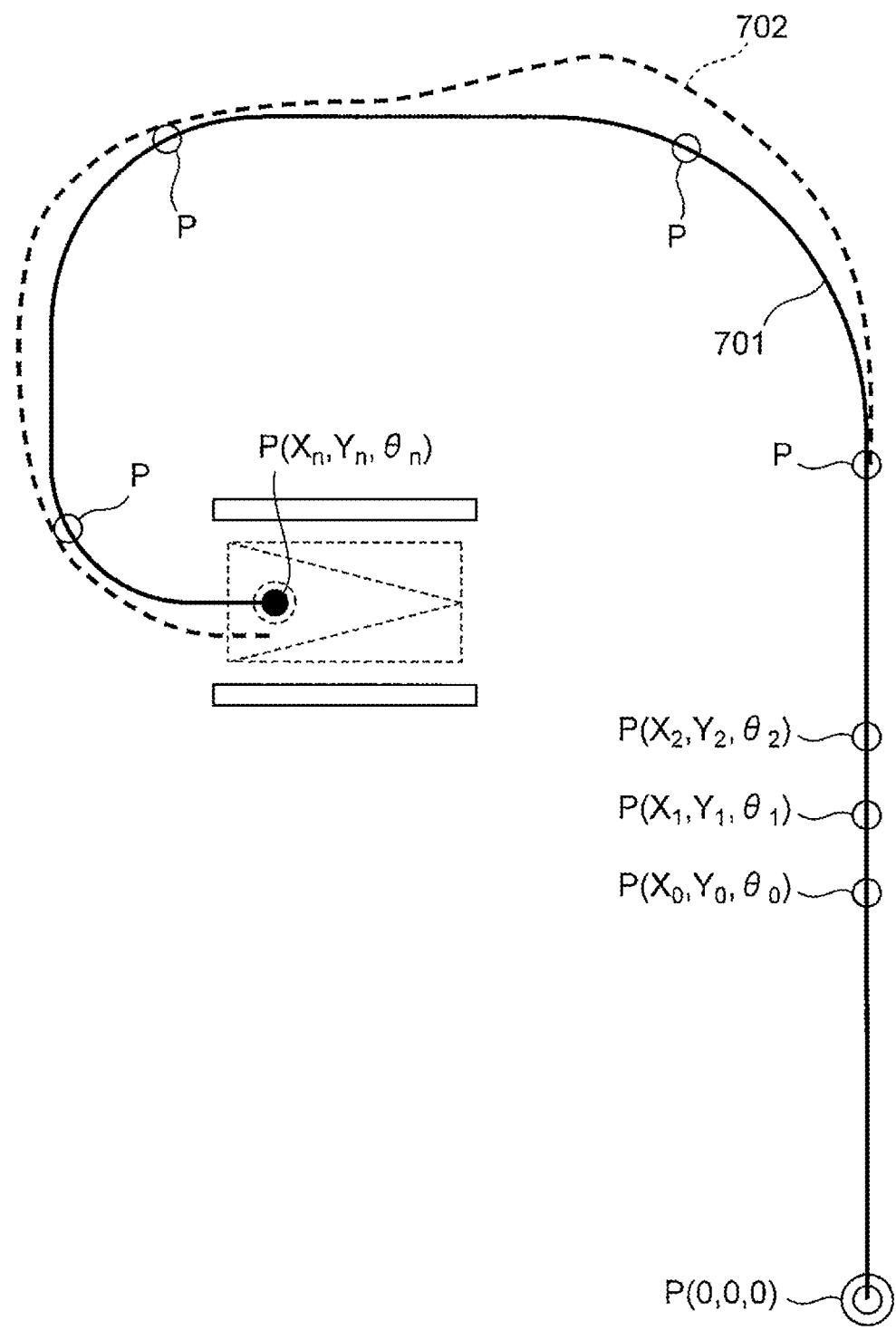
FIG. 9 is a diagram illustrating an example of a travel route stored in a storage unit and a travel track by autonomous driving.

FIG. 9 is a diagram illustrating an example of a travel route stored in the storage unit and a travel track by autonomous driving.

A solid line 701 illustrated in FIG. 9 is a travel route of the vehicle 10 stored in the storage unit 330 in the route storage mode S382, and a broken line 702 illustrated in FIG. 9 is a travel locus of the vehicle 10 by autonomous driving. The travel route is a travel route of the vehicle 10 estimated by using a wheel pulse when the vehicle actually travels and information from the steering angle sensor. In the storage unit 330, the travel route is divided at regular intervals, and information on each division point is stored as a route storage point P (Xn, Yn, and θn). In the normal driving mode S380, a target vehicle track, which is a travel route of the vehicle 10 to a target parking position, is generated by complementing space between a plurality of the route storage points P with a straight line or a curve.

At this time, since a steering angle range of a steering angle at which steering can be performed only by the generated steering force of the electric power steering 3 in a state where the steering operation by the driver is not added is narrower than the steering angle range of the steering wheel at which steering can be performed by the driver, if the driver performs the steering operation using the oversteer angle exceeding the steering angle range of the steering angle at which steering can be performed only by the generated steering force of the electric power steering 3 during route storage and causes the storage unit 330 to store the travel route, the travel route cannot be traced in the autonomous driving, and a route passing outward the travel route indicated by the solid line 701, for example, the travel route indicated by the broken line 702 is obtained.

The autonomous driving mode S381 transitions by receiving an autonomous driving start command in the normal driving mode S380. The autonomous driving start command may be issued based on the operation of the driver, or may be automatically issued when GPS information is compared with a past storage start point and the position is appropriate. In the autonomous driving mode S381, the vehicle control device uses information in the storage unit 330 to perform driving operation on behalf of the driver. In a case where an end point is reached, an autonomous driving end command is output, the driving operation performed by the vehicle control device as a substitute ends, and the mode transitions to the normal driving mode S380. The autonomous driving end command can also be issued by cancel operation by the driver or the like.

The vehicle control device performs control to cause the host vehicle to automatically travel along the travel route 405 by autonomous driving at least from an autonomous driving startable start point (for example, the route storage point 406) to the final parking position 401. The autonomous driving is performed on the basis of information obtained by various external environment recognizing means or the like. In the present embodiment, a configuration and a method of the autonomous driving are not restricted, and are performed using a publicly-known technique. The autonomous driving automatically ends when the vehicle reaches the final parking position 401 which is an end point.

In a case where the storage of a travel route in the storage unit 330 is started by the storage start operation, the route storage mode S382 starts. In the route storage mode S382, the driver performs vehicle operation until end of the route storage processing is executed, and an own travel route including start point and end point information is stored in the storage unit 330.

The vehicle control device determines whether a value of the steering angle sensor changes beyond a predetermined threshold during the route storage mode S382. As the threshold, an oversteer angle threshold for determining oversteer angle operation and a stationary steering threshold for determining stationary steering operation are set. Then, it is determined whether steering is performed, that is, whether the stationary steering operation is performed when the vehicle speed is zero first. Specifically, it is determined whether or not a change amount of a steering angle is larger than the stationary steering threshold in a state where the vehicle speed is zero. This determination is continuously performed until the vehicle speed becomes greater than zero. As the stationary steering threshold, a steering angle immediately before the vehicle speed becomes zero is stored. For the stationary steering threshold, a value larger than 0 degrees and smaller than 30 degrees as a steering angle is set in addition to the stored value. This value is assigned with a sign in a case where the sign changes depending on a steering direction, and is used for determination by being set to a value larger than 0 degrees and smaller than 2 degrees in a case where an actual steering angle is used. In a case where it is determined that the stationary steering operation is performed, the steering angle restriction control is performed.

In the steering angle restriction control, control is performed to lower a steering assist force of the electric power steering or generate a reaction force to create a state in which the driver cannot steer or has difficulty steering. The driver has difficulty operating the steering wheel due to the steering angle restriction control, and knows by tactile sense that the driver is about to perform recommended steering. In a case where the steering is further continued, the electric power steering 3 generates torque in a direction in which the rotation angle is prevented from increasing. For this reason, the driver cannot perform the steering operation at a certain angle or more. In this way, the steering angle restriction that is an aim of the present invention is implemented.

In a scene that is not a determination target of the stationary steering, the driver's oversteer angle operation is prevented by processing of comparing the oversteer angle threshold with a value of the steering angle sensor. The oversteer angle threshold is set to a maximum steering angle at which steering can be performed only by the steering force generated by the electric power steering 3 or a point at which a relationship between a steering angle and a turning radius changes from a linear increase to a non-linear increase, but a margin may be added to some extent. As a guide, a value around 90% of the maximum steering angle of the steering wheel is used. Then, even in a case where the steering angle changes across the stationary steering threshold, the steering angle restriction control is performed.

After the steering angle restriction is performed, the steering angle restriction control ends when there is a cancellation request by the driver. The cancellation request may be made by a switch or may be made in a case where steering torque becomes equal to or more than a threshold. Further, in a case where the route storage mode S382 ends, the steering angle control is unnecessary, and thus the steering angle restriction control ends.

Further, also in a case where the steering angle becomes equal to or less than the oversteer angle threshold while the steering angle restriction control is performed, the steering angle restriction control ends. In order to prevent frequent switching of control near the oversteer angle threshold, a hysteresis may be provided for a release threshold. When the traveling direction is switched during the route storage mode, control is performed to automatically return steering to the vicinity of a neutral position before performing the stationary steering determination.

While all the above control is being performed, an alarm, reading of a message, and display of a message are used to notify that control is being performed so that the driver is not confused by a sudden change between steering. Alternatively, a steering wheel or a seat may be vibrated.

Further, in a case where a steering angle of the vehicle at the start of the route storage mode S382 is equal to or more than the oversteer angle threshold, the steering angle restriction control is not performed until the steering angle of the vehicle falls below the oversteer angle threshold once. This is to prevent the driver or the like from feeling uncomfortable due to sudden narrowing of the steering range by the steering angle restriction control.

According to the vehicle control device of the present embodiment, the steering angle restriction control is performed in a case where specific operation is performed in the route storage mode S382. During autonomous driving, not the driver but an actuator performs steering as a substitute. However, a steering range by the actuator is usually set to be smaller than a steering range by the driver due to a problem of an output upper limit and controllability. In contrast, it is necessary to greatly change a vehicle attitude angle when guiding the vehicle into a parking frame or in traveling in a parking lot and on a peripheral road, and the driver often operates the vehicle at a relatively large steering angle. Here, operation at an oversteer angle exceeding a steering range that can be operated by the control actuator may be performed by the driver.

If the driver performs the oversteer angle operation at the time of route storage, only a steering angle smaller than the oversteer angle can be used at the time of autonomous driving by the actuator. Therefore, when a stored route stored as the driver performs the oversteer angle operation is to be traced by autonomous driving, the vehicle inevitably travels outward the stored route on the curve, and tracing of the stored route becomes impossible. Such behavior sometimes leads to deviation from the vehicle path, and the vehicle cannot travel. For this reason, it is necessary to match the steering range by the actuator and the steering range by the driver by control to avoid the problem. Further, when the stationary steering operation is performed, a vehicle attitude angle may change without detection of a wheel pulse, which may affect the estimation of a vehicle state.

The vehicle control device according to the present embodiment performs control for preventing the oversteer angle operation and control for preventing the stationary steering operation as the steering angle restriction control at the time of route storage. Therefore, it is possible to create a travel route in which tracing by the vehicle is facilitated in the autonomous driving in the route storage mode, and it is possible to improve the positional accuracy of the vehicle in the autonomous driving mode.

Further, each of the above-described configurations, functions, processing units, processing means, and the like may be realized by hardware, for example, by designing part or all of them with an integrated circuit, and may be realized by software by a processor interpreting and executing a program that realizes each function.

Information, such as a program that performs each function, a table, and a file, can be stored in storage devices, such as a memory, a hard disk, and a solid state drive (SSD), or recording media, such as an IC card, an SD card, and a DVD.

Further, a control line and an information line that are considered necessary for explanation are shown, and not all control lines or information lines necessary for implementation are shown. In practice, almost all configurations can be considered to be connected mutually.

Although the embodiment of the present invention has been described in detail above, the present invention is not restricted to the above embodiment, and various design changes can be made without departing from the spirit of the present invention described in the claims. For example, the above embodiment is described in detail for easy understanding of the present invention, and the present invention is not necessarily limited to an embodiment that includes all the described configurations. Part of a configuration of a certain embodiment can be replaced with a configuration of another embodiment, and a configuration of a certain embodiment can be added to a configuration of another

REFERENCE SIGNS LIST 1 drive motor
2 electric hydraulic brake
3 electric power steering (control actuator)
4 steering angle sensor
5 electronic control unit (ECU)
9 steering wheel
11 to 14 camera
18 touch panel
53 vehicle speed calculation unit
200 mobile terminal
500 vehicle sensor
501 user interface
504 steering angle detection unit
505 route storage mode detection unit
507 specific operation detection unit
508 oversteer angle determination unit
509 stationary steering determination unit
510 notification determination unit
520 vehicle control device

The invention claimed is:

1. A vehicle control device having a normal driving mode in which a vehicle is driven according to operation of a driver, a route storage mode in which a travel route of the vehicle is stored, and an autonomous driving mode in which autonomous driving of the vehicle is performed by using the stored travel route, the vehicle control device comprising:
   an oversteer angle determination unit that determines whether or not a steering angle of the vehicle is an oversteer angle;
   a stationary steering determination unit that determines whether or not stationary steering operation is performed on the vehicle;
   a route storage mode detection unit that determines whether or not the route storage mode is set;
   a specific operation detection unit that determines whether the steering angle is the oversteer angle or the stationary steering operation is performed in the route storage mode; and
   an output unit that outputs a control command of steering angle restriction control to restrict steering operation of the driver in the route storage mode in a case where the specific operation detection unit determines that the steering angle is the oversteer angle or the stationary steering operation is performed.

2. The vehicle control device according to claim 1, wherein
   the output unit outputs, as the control command, a command to generate a steering reaction force of a control actuator that assists steering by the driver or a command to lower a steering assist force of the control actuator than that in the normal driving mode.

3. The vehicle control device according to claim 1, wherein
   the output unit stops output of a control command of the steering angle restriction control in a case of detecting a driver cancellation request for canceling the steering angle restriction control in the route storage mode.

4. The vehicle control device according to claim 2, wherein
   the oversteer angle determination unit compares an oversteer angle threshold determined based on a range of a steering angle at which steering can be performed by a steering force generated by the control actuator in a state where steering operation by the driver is not added with a steering angle of the vehicle, and determines that the steering angle is the oversteer angle in a case where the steering angle of the vehicle is larger than the oversteer angle threshold.

5. The vehicle control device according to claim 4, wherein
   in a case where a steering angle of the vehicle at start of the route storage mode is equal to or more than the oversteer angle threshold, the oversteer angle determination unit does not execute the steering angle restriction control until the steering angle of the vehicle falls below the oversteer angle threshold once.

6. The vehicle control device according to claim 1, wherein
   the specific operation detection unit outputs a notification control command for notifying that specific steering operation is performed in a case where a steering angle is determined to be the oversteer angle or the stationary steering operation is performed.

* * * * *